2,750,397
PRODUCTION OF HALOGENATED POLYCYCLIC ALCOHOLS

Arthur Goldman, Morton Kleiman, and Henry G. Fechter, Chicago, Ill., assignors to Velsicol Chemical Corporation, a corporation of Illinois No Drawing. Application October 6, 1952, Serial No. 313,372

5 Claims. (Cl. 260—410)

This invention relates to the preparation of novel halogenated polycyclic alcohols. More specifically, this invention relates to the chlorohydrin derivatives of 1-halo-4,5,6,7,8,8 - hexachloro - 3a,4,7,7a - tetrahydro - 4,7-methanoindene, said halogen in the number 1 position being fluorine, chlorine or bromine. The products of the present invention have the following structure:

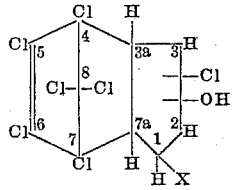

wherein X is fluorine, chlorine or bromine. As indicated above, the hydroxyl group can occupy either the position designated as number 2 or that designated as number 3. The chlorine atom adjacent thereto occupies the remaining open position.

A chlorohydrin as above shown may be prepared by reacting a 1-halo-4,5,6,7,8,8-hexachloro-3a,4,7,7a-tetrahydro-4,7-methanoindene with tertiary butyl hypochlorite in the presence of an organic acid, followed by hydrolysis of the intermediate ester formed. A specific example of this method utilizing 1-chloro-4,5,6,7,8,8-hexachloro-3a,4,7,7a-tetrahydro-4,7-methanoindene is herewith presented.

The 1-chloro starting material may be prepared by reacting hexachlorocyclopentadiene and cyclopentadiene to form the Diels-Alder adduct, purifying said adduct by recrystallization from methanol, and then chlorinating said adduct with chlorine in the presence of fuller's earth as a catalyst.

Example I

Glacial acetic acid (180 ml.) and 1,4,5,6,7,8,8-heptachloro-3a,4,7,7a-tetrahydro-4,7-methanoindene (M. P. 94° C.; 112 g. 0.3 mol) were placed in a flask and heated with stirring to about 80° C. t-butyl hypochlorite (38 cc.; 0.3 mol) was slowly added while maintaining said temperature. A white precipitate formed. An additional 38 cc. t-butyl hypochlorite was then slowly added and the mixture was heated for two hours at 75°–80° C. The mixture was cooled and the crystalline precipitate was isolated by filtration. This material was washed thoroughly with water and then dried. It was then recrystallized from benzene and in the thus purified form melted at 233.5°–234.0° C. This product was the acetate derivative of the desired chlorohydrin.

The acetate derivative, above described (43.5 g.; 0.093 mol), was placed in 500 ml. methanol contained in a 1000 ml. flask. This mixture was saturated with anhydrous HCl and refluxed for twelve hours. The excess methanol and the resulting methyl acetate were removed by distillation in vacuo. The residue was taken up in diethyl ether, washed with water, and sodium bicarbonate, and then dried over CaCl₂. The ether mixture was then filtered and the ether was removed from the filtrate by distillation in vacuo. The residue, which was the crude desired product, namely, 2,3-chlorohydrin of 1,4,5,6,7,8,8-heptachloro-3a,4,7,7a-tetrahydro-4,7-methanoindene was crystallized from hexane to yield a purified product melting at 153.7°–155.0° C. and having the following analysis:

|    | Calculated for $C_{10}H_8OCl_8$ | Found for Product |
|----|---|---|
| C  | 28.20 | 28.14 |
| H  | 1.42  | 1.28  |
| Cl | 66.62 | 66.37 |

Example II shows the preparation of the 2,3-chlorohydrin derivative, 1-bromo-4,5,6,7,8,8-hexachloro-3a,4,7,7a-tetrahydro-4,7-methanoindene.

The 1-bromo starting material can be prepared by reacting hexachlorocyclopentadiene and cyclopentadiene to form the Diels-Alder adduct thereof, purifying said adduct by crystallization from methanol and then brominating said adduct with bromine in the presence of peroxide to form the 1-bromo derivative thereof.

Example II

1 - bromo - 4,5,6,7,8,8 - hexachloro - 3a,4,7,7a - tetrahydro-4,7-methanoindene (83.5 g.; 0.2 mol; M. P. 70° C.) and glacial acetic acid (120 cc.) were placed in a 3-necked flask equipped with stirrer, thermometer, reflux condenser and dropping funnel. The mixture was heated to 75° C. with stirring, and t-butyl hpyochlorite (35.3 ml.; 0.30 mol) was slowly added while maintaining said temperature. Heating at 75°–80° C. was continued for five hours. The solution was cooled and the crystalline precipitate which formed was removed by filtration. This product comprising the acetate derivative of 2,3-chlorohydrin of 1-bromo-4,5,6,7,8,8-hexachloro-3a,4,7,7a-tetrahydro-4,7-methanoindene was further reacted to produce the chlorohydrin without further purification at this point.

The crude acetate of the paragraph above (140 g.) was placed in methanol (1200 ml.) and the mixture was saturated with dry HCl. After refluxing for twelve hours, the excess methanol and the formed methyl acetate were removed by distillation in vacuo. The residue was taken up in diethyl ether, was washed with sodium bicarbonate and water, and then dried over CaCl₂. The dried solution was filtered, and the ether removed from the filtrate by distillation in vacuo. The crystalline residue was purified by crystallization from benzene. It had a melting point of 147° C. and the following elemental analysis:

|    | Calculated for $C_{10}H_8OCl_7Br$ | Found for Product |
|----|---|---|
| C  | 25.54 | 25.54 |
| H  | 1.29  | 1.33  |
| Br | 16.99 | 16.41 |

Example III shows the preparation of 2,3-chlorohydrin derivative of 1-fluoro-4,5,6,7,8,8-hexachloro-3a,4,7,7a-tetrahydro-4,7-methanoindene.

The 1-fluoro starting material may be prepared from the 1-chloro or 1-bromo starting materials of Examples I and II, respectively, by reaction thereof with mercuric fluoride.

Specifically, the 1-fluoro starting material may be prepared from 1 - bromo - 4,5,6,7,8,8 - hexachloro - 3a,4,7,7a-tetrahydro-4,7-methanoindene as follows:

A solution of 42 grams of said 1-bromo material in 275 ml. of purified hexane is placed in a dry 500 ml., 3-necked flask equipped with a reflux condenser, thermometer, and stainless steel blade stirrer. The reflux condenser is removed and approximately 75 ml. of hexane is allowed to boil away. This insures a sufficiently dry atmosphere in the reaction vessel. The condenser, fitted with a drying tube, is then replaced. Anhydrous mercuric fluoride (24 grams) is added and the mixture is then heated under reflux with vigorous stirring for nineteen hours. After refluxing and subsequent cooling, the reaction mixture is filtered to remove inorganic salts. The filtrate is concentrated by distillation, and the crystalline product resulting from the above concentration can be purified by recrystallization from pentane at about 0° C. The substantially pure 1-fluoro-4,5,6,7,8,8-hexachloro-3$a$,4,7,7$a$-tetrahydro-4,7-methanoindene melts at about 181–182° C.

*Example III* t-Butyl hypochlorite (250 ml.; 2.0 mol) was added slowly over a two-hour period to a stirred solution of 1 - fluoro - 4,5,6,7,8,8 - hexachloro - 3$a$,4,7,7$a$ - tetrahydro-4,7-methanoindene (357 g.; 1 mol) in glacial acetic acid (600 ml.). The temperature rose from 26° C. to 32° C. due to the exothermic nature of the reaction during the two-hour addition period. Stirring was continued for an additional eighteen hours at a temperature of about 26° C. Supernatant liquid was decanted from a formed crystalline precipitate after having chilled the mixture to 10° C. The precipitate was triturated with pentane and then dried. The thus purified product, which was the acetate derivative of the chlorohydrin desired, melted at 220° C.–221° C.

The acetate of the above paragraph (220 g.; 0.49 mol) was placed in methanol (2.5 l.) and the resulting solution was acidified with dry HCl and then refluxed for eight hours. The excess methanol and the formed methyl acetate were removed by distillation in vacuo. The residue was purified by recrystallization from hexane and the thus purified product had a melting point of 147°–149° C. An elemental analysis of material prepared in accordance herewith was as follows:

|   | Calculated for $C_{10}H_9OCl_7F$ | Found for Product |
|---|---|---|
| C | 29.33 | 29.23 |
| H | 1.47 | 1.28 |
| Cl | 60.6 | 60.7 |

While the process shown in Examples I to III is specific, obviously many variations can be used.

The reaction shown in the examples proceeds satisfactorily with an excess of organic acid as the only solvent; other nonreactive solvents may be added if desired.

The organic acid used may be different from that shown in the examples. Acids having a relatively low molecular weight, such as acetic, propionic or butyric acid, are preferred; however, higher acids such as those containing from about five to about fourteen carbon atoms may also be used in the presence of a solvent. The intermediate ester formed is that of the chlorohydrin and the acid utilized.

The ester formed as an intermediate need not be purified prior to subjecting it to hydrolysis to form the chlorohydrin. Such hydrolysis can be accomplished in aqueous media using a strong base such as KOH or NaOH as catalyst. More preferred, such hydrolysis may be accomplished by transesterification, utilizing a lower alcohol such as methanol, ethanol, propanol, etc.

The temperature of reaction for the process shown in the examples may vary. Thus, in the first step to produce the ester, the reaction may be carried out at a temperature between about 20° C. and about 150° C. The formation of the chlorohydrin from the ester by transesterification may be carried out at a temperature between about 50° C. to about 150° C. If aqueous hydrolysis is used, a most convenient temperature is the boiling point of water.

The ratio of reactants is not critical; however, it is preferred that an excess of organic acid be used in the formation of the ester derivative. An excess of hypochlorite is also preferred.

The compounds of the present invention are valuable insecticides and are useful in the control of a wide variety of insect pests. The present compounds are also valuable intermediates in the preparation of epoxides of the starting materials herein utilized, which epoxides are also very valuable insecticides.

The compounds of the present invention may be utilized and applied as a sole active ingredient dispersed in carriers such as dusts, solvents, aqueous dispersions or other carriers frequently used in the art. In addition, the compounds of the present invention can be used in combination with other insecticides or fungicides.

We claim as our invention:

1. The 2,3-chlorohydrin derivative of 1-halo-4,5,6,7,8,8-hexachloro - 3$a$,4,7,7$a$ - tetrahydro - 4,7 - methanoindene wherein the halogen atom in the 1 position is of the group consisting of fluorine, chlorine and bromine.

2. The 2,3-chlorohydrin derivative of 1-fluoro-4,5,6,7,8-hexachloro-3$a$,4,7,7$a$-tetrahydro-4,7-methanoindene.

3. The 2,3-chlorohydrin derivative of 1,4,5,6,7,8,8-heptachloro-3$a$,4,7,7$a$-tetrahydro-4,7-methanoindene.

4. The 2,3-chlorohydrin derivative of 1-bromo-4,5,6,7,8,8 - hexachloro - 3$a$,4,7,7$a$ - tetrahydro - 4,7-methanoindene.

5. The carboxylic acid ester of claim 1, said acid being a saturated aliphatic hydrocarbon carboxylic acid containing less than fifteen carbon atoms.

References Cited in the file of this patent

UNITED STATES PATENTS

| 2,519,190 | Hyman | Aug. 15, 1950 |
| 2,528,654 | Herzfeld | Nov. 7, 1950 |
| 2,672,486 | Kleimen et al. | Mar. 16, 1954 |
| 2,678,898 | Buntin | May 18, 1954 |